United States Patent [19]

Atkins et al.

[11] Patent Number: 5,437,886
[45] Date of Patent: Aug. 1, 1995

[54] CUTTING PROCESS

[75] Inventors: Anthony G. Atkins, Newbury; Leonard D. Hughes, Rushden; George Jeronimidis, Reading; Paul Jolley, Otterhampton; Peter Purslow, Bristol; Peter Wilding, Raunds, all of Great Britain

[73] Assignee: Unilever Patent Holdings B.V., Rotterdam, Netherlands

[21] Appl. No.: 8,891

[22] Filed: Jan. 25, 1993

Related U.S. Application Data

[63] Continuation of Ser. No. 676,169, Mar. 28, 1991, abandoned.

[30] Foreign Application Priority Data

Mar. 28, 1990 [GB] United Kingdom ............... 9006880

[51] Int. Cl.$^6$ .......................................... A23L 1/025
[52] U.S. Cl. ............................... 426/518; 426/512; 426/513
[58] Field of Search .................... 426/513, 518, 512

[56] References Cited

U.S. PATENT DOCUMENTS

| | | |
|---|---|---|
| 1,977,322 | 10/1934 | McKinney . |
| 2,349,465 | 5/1944 | Rupin . |
| 2,527,493 | 10/1950 | Condon . |
| 3,622,353 | 6/1969 | Bradshaw et al. . |
| 3,634,561 | 1/1972 | Hawkins et al. . |
| 3,769,036 | 10/1973 | Garnett ..................... 426/513 X |

FOREIGN PATENT DOCUMENTS

| | | |
|---|---|---|
| 0153148 | 2/1985 | European Pat. Off. . |
| 0322220 | 12/1988 | European Pat. Off. . |
| 114632 | 1/1900 | Germany . |
| 59-063171 | 4/1984 | Japan . |
| 59-120060 | 7/1984 | Japan . |
| 60-153776 | 8/1985 | Japan . |
| 1478634 | 7/1977 | United Kingdom . |
| 2148101 | 5/1985 | United Kingdom . |

OTHER PUBLICATIONS

Patent Abstracts of Japan, vol. 10, No. 366 (C-390) (2423) 6 Dec. 1986 & JP-A-61 162 155 (Nippon Suisan) 22 Jul. 1986.

*Primary Examiner*—Joseph Golian
*Attorney, Agent, or Firm*—Cushman Darby & Cushman

[57] ABSTRACT

A hard-frozen anisotropic foodstuff is subjected to a process of "veneer-peeling" at a core temperature of $-40°$ C. to $-5°$ C. In this "veneer-peeling" the hard-frozen foodstuff is for example cut in the manner of a lathe or like a pencil-sharpener. If the foodstuff is raw or uncooked meat, veneer-peeling weakens or fragments the strong connective tissue within the meat whilst retaining the essential fibrous character of the muscle fibers resulting in less tough meat. Thus lower quality meat can be upgraded. A wide array of morphologies of meat particles can be prepared. Other food materials cut in this way are ice cream, coconut, vegetables and hide material leading to offcut with new and useful morphologies.

14 Claims, 2 Drawing Sheets

CUTTING PROCESS

This is a continuation of application Ser. No. 07/676,169, filed on Mar. 28, 1991, which was abandoned upon the filing hereof.

The present invention relates to a process of cutting a hard-frozen anisotropic foodstuff, preferably hard-frozen meat, at temperatures of at most −5° C.

The types of meat normally used for manufactured meat products made by comminution and shaping, such as burgers, sausages and the like, contain, in addition to lean meat and fat, various types of connective tissue, collectively described as gristle or sinews. Gristle varies considerably in type and physical properties and it is the type and the amount of connective tissue which generally dictates the quality of meat.

The aim of comminution is to reduce the connective tissue to sufficiently small particle sizes, such that it becomes unobtrusive in the mouth upon consumption of the final meat product. As a consequence, the comminution system used must be selected such that it can deal with that tissue in meat, which has the greatest physical strength and toughness (or fracture resistance), in other words: the type and the quality of the meat dictate the type of comminution method and apparatus to be applied. For beefburger type meats, for example, the connective tissue with the greatest physical strength and toughness can be the elastin and collagen network containing fascia, elastic tissue which is present in many areas of the carcass, particularly in forequarter meat and flank. It will be clear, however, that a comminution method or apparatus, which is designed to physically break down the almost strongest and toughest parts of the meat, will inevitably break down the weaker tissue to a greater and potentially unacceptable extent, depending on the desired character of the final product. The much weaker, lean muscular tissue of meat usually suffers very extensive breakdown during comminution and this breakdown is further increased during subsequent unit operations, which involve mechanical working of the meat, like e.g. mixing, pressure forming, extrusion and the like. In many products the effects of comminution on muscular tissue are such that the essential structure of the meat, the fibre bundles, is extensively disrupted. This constitutes an enormous drawback, since it limits the textural scope of products and in particular the consumer's perception of fibrousness (which to him is a pointer of high quality meat) depends on the presence of substantially intact muscle fibre bundles. The current methods of fine comminution therefore lead to products having textures which are not perceived as particularly fibrous, but rather as granular, or rubbery and gelled. If one tries to avoid this and uses a comminution method or apparatus which will yield a perceived larger particle size of the muscular tissue, then the connective tissue is not sufficiently comminuted and the perception of toughness or gristliness almost entirely eclipses the good perception of fibrousness. An alternative is to use high quality but more costly raw material with a lower proportion of connective tissue.

The present comminution methods hence always constitute a compromise, in which the gain in perceived fibrousness (i.e. the indication for the consumer of high quality meat) is obtained at the cost of an overriding perception of toughness and vice versa.

In addition to the comminution action per se there is the effect of the temperature at which the comminution is performed. The material properties of meat vary enormously with temperature and conventional comminution systems such as mincers, grinders and flake cutters work effectively within rather narrow ranges of temperature. For example, at −4° C. or above, meat is subject to considerable plastic deformation which, owing to the shear and other forces during comminution, results in extensive disruption of the muscular tissue. (By plastic deformation is understood throughout this application and the attached claims that the meat exhibits flow when subjected to the high stresses of comminution and that this flow is accomplished by internal damage to the piece of meat, such that it does not recover from the applied stresses). At very low temperatures, on the other hand, pieces of meat tend to shatter on impact into fine fragments, which also results in extensive damage to fibre bundle structure, and this damage and loss of fibrousness are perceived by the consumer in the final product as a lesser quality meat.

It would be preferable, however, if meat could be comminuted at cold store temperatures (e.g. at −20° C.) and particularly without a pre-breaking step. Such a process would be very advantageous from an economical point of view, since no tempering and pre-comminution would be required. At present, no continuous comminution process or equipment is suitable for this purpose, whereas existing methods require a large amount of power and, as stated above, lead to a considerable extent of shattering of the muscle fibres and/or muscle fibre bundles.

In U.S. Pat. 2,527,493 for example meat is sliced into paper-thin slices at a temperature of −20° F. to −40° F. (about −29° C. to −40° C.) by means of a rotary cutter. The very thin hard frozen slices break into flakes which may be compressed into a cake or patty. This treatment also leads to extensive damage to the muscular fibres and although for burger-type products such a damaged structure would not be too disadvantageous, for other products the range of texture which is obtainable by the products of this cutting process, is limited. Moreover, here also the flakes would be further damaged during their processing at higher temperatures.

In view of these disadvantages of the existing comminution methods there is still a need for a method of comminuting hard-frozen foodstuffs, particularly blocks of hard-frozen raw meat, without tempering or pre-breaking, in which the strong connective tissue of the meat is weakened or fragmented, but at the same time the essential fibrous character of the muscle fibres is preserved; in other words, a method in which the strongest and toughest material is preferentially damaged, whilst retaining the desired structure of the weaker material.

By "hard-frozen" or "hard-freezing" is to be understood throughout this specification and the attached claims that the foodstuff is brought to, or has, a core temperature of from −40° C. to −5° C. Preferably the core temperature is from −20° C. to −5° C. and most preferably from −25° C. to −5° C.

It has now been found in extensive experiments that hard-frozen anisotropic foodstuffs can be continuously comminuted at a high cutting rate in a controllable way by subjecting them to a cutting process, in which the relatively stronger or more brittle material parts are weakened by fracturing them without simultaneously extensively damaging the relatively weaker or less brittle parts. By applying the cutting process according to the present invention to the hard-frozen anisotropic foodstuff material, preferentially multiple fractures are effected in the relatively stronger material.

By applying the cutting process according to the present invention to hard-frozen raw meat it appeared that the primary muscle fibre bundles are defasciated in a controlled manner essentially without plastic deformation or shattering of the primary muscle fibre bundles or muscle fibres. The relatively weaker fibrous texture of the hard-frozen meat is thus retained, but the relatively harder and tougher connective tissue is selectively weakened or damaged. It has been observed that in the cut material there is a high proportion of material that retains fibre alignment and also that sometimes a certain periodicity in the location of damage within the tissue occurs. In cooked meat, dependent on the type of meat and the applied heat treatment, the connective tissues may still represent the stronger tissue relative to muscle tissue. In such a case the process according to the present invention may still be advantageously applied to such cooked meat.

BRIEF DESCRIPTION OF THE DRAWINGS

The specific details of the accompanying figures are described in further detail by way of the EXAMPLES.

During the investigations into the physico-mechanical properties of uncooked meat at temperatures between $-50°$ C. and $-5°$ C. it has been found that during the cutting of hard-frozen raw meat according to the present invention, separation of the material into bundles of fibres occurs without plastic deformation or shattering of the bundles. These bundles may or may not equate with those naturally occurring in the meat as primary muscle fibre bundles, depending on the conditions of cutting. Apparently the connective tissue at the prevailing temperature is preferentially broken down during the specific type of cutting process according to the present invention. The final result is that in the cut, hard-frozen anisotropic meat, the connective tissues are substantially fractured and thus weakened, but at the same time the lean tissue remains substantially undamaged. This is a structure which cannot be obtained with any of the known cutting or comminuting methods of hard-frozen meat, since in using the conventional cutting methods, the structure of the meat is either extensively disrupted (e.g. like in a Urschel Comitrol (Trade Mark) or a Karl Schnell cutting/flaking device or a Mincemaster (Trademark) or torn apart (like e.g. in an Eirich mill).

The method of cutting hard-frozen anisotropic meat according to the present invention also appeared to be very flexible in that a wide range of meat types could be cut to produce particles, the morphology of which could be controlled to range from small fragments to discrete large units of material. Within this wide range of morphologies there is additionally the facility to exercise simultaneous control over the thickness and thickness distribution of the foodstuff particles. Thus the method of cutting hard-frozen meat according to the present invention by a combination of different cutting speeds, cutting temperatures, depths of cut and feed rates opens the possibility to prepare from blocks of hard-frozen, preferably uncooked, meat at low cost in an efficient and controllable manner meat particles having a wide range of morphologies and physical properties. Since the method is carried out with the meat in a hard-frozen state, the risk of meat spoilage and bacterial growth is also sharply reduced, and there is a reduced amount of waste material.

In hard-frozen anisotropic vegetables the relatively harder or brittle parts are the ice particles dispersed throughout the vegetable tissue, which in itself constitutes the relatively weaker part of the material. In some vegetables the cellulose and lignin parts may also represent the relatively harder or brittle parts compared to e.g. soft leaf tissue.

The cutting process according to the present invention may, however, also be applied to other foodstuffs, in which case the advantage of the weakening or the fragmentation of the relatively strong or brittle connective tissue as in meat may be replaced by other advantages like the wide range of morphologies of the particles obtained. Thus hard-frozen dough, ice cream (especially ice cream admixed with fruit, chocolate, coconut, bakery products or other confectionery material, but also water ice, admixed with fruit, coconut or confectionery material), dairy products (like cheese), vegetable proteins, fungal proteins, animal proteins (like hard-frozen hides, limed or unlimed hide splits, or enzymatically treated hide material, used in the manufacture of collagen dough to be used in the manufacture of sausage casings or the co-extrusion of collagen dough and foodstuffs), bakery products, confectionery products, fruit and mixtures of one or more of these foodstuffs may be subjected to the cutting process of hard-frozen anisotropic foodstuffs according to the present invention. Laminates of different foodstuffs and mixtures of different foodstuffs, which may be differently coloured and/or flavoured, may also be cut by the method according to the present invention.

Therefore, the present invention relates to a process of cutting a hard-frozen anisotropic foodstuff at a temperature of at most $-5°$ C., which is characterized in that the hard-frozen anisotropic foodstuff is subjected to a cutting process, called veneer-peeling as hereinafter defined, in which strong or brittle material parts are weakened by preferentially fracturing them without extensively damaging the weak or less brittle material parts.

Preferably the present invention relates to a process of cutting hard-frozen anisotropic meat at a temperature of at most $-5°$ C., which is characterized in that the hard-frozen meat is subjected to a cutting process, called veneer-peeling as hereinafter defined, in which the primary muscle fibre bundles are defasciated in a controlled manner without plastic deformation or shattering of the primary muscle fibre bundles or fibres. The use of raw or uncooked hard-frozen anisotropic meat is preferred.

Preferably the hard-frozen anisotropic meat is in the form of deep- or hard-frozen blocks having a core temperature from $-5°$ C. to $-25°$ C. or below. Since the actual mechanism of cutting hard-frozen anisotropic foodstuffs is highly complex and there is no convenient term or phrase, which accurately describes the process according to the present invention, the term "veneer-peeling" has been adopted, although no wood is involved and no continuous, homogeneous sheets are obtained, but rather discontinuous, ribbon-like material. By "veneer-peeling" is to be understood throughout this specification and the attached claims that a hard-frozen anisotropic foodstuff is subjected to:

(A) a rotary cutting (the axis of rotation being horizontal, vertical or at any convenient intermediate angle), in which a preferably elongate piece of the hard-frozen anisotropic foodstuff is cut in the manner of a lathe so as to produce discontinuous ribbon-like offcuts by:

(a) rotating the hard-frozen piece of foodstuff against the edge of a cutting blade, which is simultaneously moving into the foodstuff, its direction of motion being either parallel or perpendicular or at any convenient angle to the axis of rotation of the hard-frozen anisotropic foodstuff, or, (b) rotating at least one cutting blade about the axis of a stationary or moving, preferably elongate piece of a hard-frozen anisotropic foodstuff, the cutting blade simultaneously moving into the foodstuff with a direction of motion parallel, perpendicular, or at any convenient angle with respect to the rotation axis of the hard-frozen anisotropic foodstuff;

(B) cutting with a "pencil-sharpener"-like cutting device having at least one cutting blade adjusted at an angle with the axis of rotation of the hard frozen anisotropic foodstuff, during which cutting either the hard-frozen anisotropic foodstuff or the cutting device or both may rotate, so as to weaken the relatively stronger or more brittle material parts by fracturing them without simultaneously extensively damaging the relatively weaker or less brittle parts.

The "pencil-sharpener"-like cutting device having at least one cutting blade adjusted at an angle with the axis of rotation of the hard-frozen anisotropic foodstuff and facing inwardly into the cone, has its conical opening facing the hard-frozen anisotropic foodstuff, but may also have the cutting edge of the cutting blade facing outwardly. In the latter case the cutting device acts as a drilling or milling device, which "drills" into the piece of hard-frozen anisotropic foodstuff, thus forming a more or less conical hole in the foodstuff.

In all cases the cutting tool or blade may act end-on, tangentially or at any convenient angle to the axis of rotation of the hard-frozen anisotropic foodstuff. Also the angle of the cutting edge with the hard-frozen anisotropic foodstuff (the angle of attack) may be varied.

If more than one cutting blade is used, the cutting blades may be adjusted at different angles with the axis of rotation of the anisotropic hard-frozen foodstuff and the blades may overlap or cross each other. Where mechanically possible, the cutting blade may instead of straight, be curved, S-shaped, spirally wound around a cone facing outwardly (e.g. in the drilling or milling device referred to above) or in a cone, facing inwardly. In all cases the piece of hard-frozen anisotropic foodstuff may also be pushed forward by e.g. spring action.

The definition of "veneer-peeling" also encompasses these variants mentioned herebefore.

It is important to observe that the process according to the present invention does not relate to a slicing process, in which the slicing tool simply passes through a piece of material and does not or essentially not give rise to any irreversible deformation of the slice of material formed in the slicing process.

In the cutting process according to the present invention not only a piece of material is severed from a larger piece of material, but in the piece of material cut off permanent deformations of the material are effected, which are the result of the use of the specific cutting tool, the cutting conditions, and the cut material geometry used in the cutting process. The permanent deformations effected in the severed off material particles produce the desired reduction in toughness of the meat as perceived by the consumer.

It is known from European Patent Application EP-A-0,153,148 to slice cooked meat for the preparation of döner kebabs by rotating a large cylindrical loaf of compressed, cooked meat about its vertical axis and cutting pieces off the cylinder by a knife having its cutting edge extending tangentially with respect to the axis of rotation of the meat and to the curved surface of the cylindrical meat loaf. The knife may, however, also function with its cutting edge parallel to the axis of rotation of the meat loaf. First of all this is a typical slicing operation, rather than a cutting operation as set out herebefore. Moreover this is a very slow process, the meat cylinder rotating at a rate of 0.1 to 0.5 rpm. In case the knife means is advanced by hand, there is very little control of the whole slicing process.

It is well known, however, that cooked meat is far easier to cut than hard-frozen uncooked meat, and the mechanical properties of hard-frozen uncooked meat are entirely different from those of cooked meat.

Furthermore it is known from Japanese Patent Application JP-A-59-120,060 (Nippon Suisan KK) to prepare continuous homogeneous sheets of foodstuff material by heating foodstuff material, optionally with a binder and seasonings, to form a united block (in the shape of columns or cylinders). A supporting axis is then inserted in a central axis of the block and the block is rotated around the said supporting axis and cut along the circumferential plane to manufacture a continuous homogeneous sheet of food material.

If desired the food material block, which is obtained by heating (e.g. to 95° C. for 90 minutes), may optionally be frozen after this heat treatment (e.g. by keeping it for 4 hours at −25° C.).

The purpose of the method according to this Japanese Patent Application is to prepare in a typical slicing process continuous, homogeneous sheets of food material, in other words: intact, coherent sheets of food material, (which has been enabled by the heating step), in a compact way instead of individual sheet production by severing slices from heat-set blocks.

There is no reference or suggestion to a method of weakening strong or brittle material parts in a hard-frozen anisotropic foodstuff by preferentially fracturing these parts without extensively damaging the weaker or less brittle material parts. As a matter of fact, fracturing of the food material would prevent the formation of continuous, homogeneous sheets of food material. Moreover in this Japanese patent application there is neither a reference nor a suggestion about the defasciating action of cutting hard-frozen anisotropic raw meat in the way of veneer peeling.

With regard to the present invention in one of the preferred embodiments of the process according to the present invention, the foodstuff is continuously shaped (e.g. by extrusion) and simultaneously cooled and frozen and subsequently hard-frozen in a horizontal or preferably, in a vertical way, after which the extruded hard-frozen anisotropic foodstuff is subjected to the veneer-peeling treatment, preferably by the "pencil-sharpening" method as described above.

In a particularly preferred embodiment, the "pencil-sharpening" method is carried out by using a rotating, cone-shaped cutting device, which is provided with at least one cutting blade. This cone-shaped cutting device may have an open structure, or it can have at least one slit adjacent to the cutting blade extending from its base to its apex, which enables the offcut of hard-frozen anisotropic foodstuff to pass through. In the veneer-peeling method in which a conical arrangement of the cutting blades is applied, the thickness of the cut is dependent on the rate at which the hard-frozen block of foodstuff advances into the cone (and/or the rate at which the conical cutting device advances into the foodstuff), on the relative speed of the cutting blade, on the number of cutting blades used and on the geometry of the cutting blade and the angle of attack between the cutting blade and the hard-frozen anisotropic foodstuff.

The hard-frozen anisotropic foodstuff or mixture of foodstuffs is preferably, but not necessarily, shaped into an elongate form having a circular, polygonal or ellipsoidal cross-section. This may for example be done during shaping in unfrozen form or during cooling and hard-freezing. It may also be started during extrusion and being completed during cooling and hard- or deep-freezing. The hard-frozen anisotropic foodstuff (or foodstuffs) may also be in a rectangular shape and can be made by simple methods, e.g. by freezing in cartons. The foodstuff(s) may also be compressed before or during freezing, or may be formed or shaped without compression. Also mixtures of foodstuffs may be used.

Preferably, the process according to the present invention is used for cutting hard-frozen, preferably raw, anisotropic meat of mammals (like beef and pork), fish, shellfish, poultry (like chicken and turkey) and mixtures of these types of meat with vegetable or fungal proteins, meat extenders, or other food ingredients, such as salt, cereals, flavouring agents, spices, vegetable, antioxidants, vitamins, dairy products like cheese, and the like.

The meat and other materials may be chemically or physically treated before or during forming and shaping by methods such as marinading, blending with salts, flavouring agents and other food ingredients, smoking, curing, at least partial cooking, tumbling, massaging, and the like.

The process of veneer-peeling hard-frozen, preferably raw, anisotropic meat according to the present invention is particularly effective in the cutting of e.g. manufacturing grade beef forequarter, which contains significant levels of fat and connective tissue. With these lower quality meats, a veneer-peeled meat product is obtained which still has a relatively high degree of fibrousness so that this veneer-peeled, hard-frozen meat can be successfully used for improving the texture of products without having to resort to higher quality (i.e. higher price) raw materials. In this way, the process according to the present invention, if applied to hard-frozen, preferably uncooked, anisotropic meat, opens a wide range of possibilities of upgrading meat and provides a new type of raw material, which can be used in composing the entire range of new, meat-based products, particularly meat-based, snack-like products.

The morphology of the meat particles obtained by the cutting process according to the present invention can be varied from small fragments to discrete, large units of meat material. Under some cutting conditions, the veneer-peeled, hard-frozen, preferably raw, uncooked meat is obtained in the form of a kind of aligned meat fibre wadding which still has coherence, rather than in the form of a discontinuous ribbon-like material. Since the defasciated primary muscle fibre bundles have protruding muscle fibres, these "hairs" of protruding muscle fibres serve to felt the fibre bundles into a non-woven fabric type of meat product.

Therefore, the invention also particularly relates to a veneer-peeled meat product obtained by the process of cutting hard-frozen, preferably uncooked, anisotropic meat according to the present invention. These meat products may be in the form of small fragments, or discontinuous, more or less homogenous ribbon-like material, but also in the form of still coherent, non-woven fabric like meat "waddings". The latter products can be used in the manufacture of a range of novel, meat-based products having a texture which up till now could not be obtained. The non-woven fabric-like meat wadding obtained by veneer-peeling by means of the process according to the present invention can be used in a whole range of new, meat-based products. The waddings can be rolled up or wound into rolls, with or without other ingredients and/or filling material, they can be used as a constituent in laminated, meat-based products; various other presentations are also possible.

Therefore, the present invention also particularly relates to meat-based products which at least partially consist of the veneer-peeled meat obtained by the process according to the present invention.

Although meat is a preferred hard-frozen anisotropic foodstuff in the process according to the present invention, the invention also relates to veneer-peeled other foodstuffs (or mixtures of foodstuffs) obtained by the process according to the present invention and these products can be incorporated in other foodstuffs and hence serve as new raw materials.

The present invention therefore also relates to foodstuffs at least partially consisting of the veneer-peeled foodstuff obtained by the process according to the present invention.

With regard to the temperature at which the process of the present invention is carried out, "hard-frozen" has been defined as having a core temperature between $-40°$ C. and $-5°$ C. Different foodstuffs have different optimal cutting temperatures and it has, for example, been found that fatty meat is more sensitive to the temperature used than lean meat and that poultry meats have different optimum temperatures than beef. In the veneer-peeling of hard- or deep-frozen, preferably uncooked meat, a temperature between $-20°$ C. and $-5°$ C. is preferred. The required low temperature can be maintained by the application of inert cold gases like nitrogen and carbon dioxide, so that the process of veneer-peeling of the hard-frozen anisotropic foodstuff takes place in an inert gas atmosphere, leading to good preservation of the quality of the hard-frozen anisotropic foodstuff. The veneer-peeling may also be carried out in a cold environment.

In experiments, a cylindrical piece of uncooked beef meat was placed in a chucking lathe with the general direction of the fibre alignment parallel to the axis of rotation and so-called "end-cutting" with the cutting tool acting end-on to the fibres, or "side-cutting" with the cutting tool acting parallel to the fibre alignment and hence cutting sideways into the fibres, or "angled cutting" with the cutting tool acting obliquely to the fibres, were applied. It appeared that in the endcutting method the optimal temperature range was a core temperature, between −25° C. and −5° C., whereas in the side cutting methods preferably a somewhat lower optimal core temperature was beneficial, viz. from −35° C. to −5° C.

It has also been found that the cutting edge of the veneer cutting tool against which the hard-frozen anisotropic, preferably uncooked, meat is rotated (or which rotates around the stationary log of meat) preferably has an angle of 20° to 30° with the horizontal. In principle smaller or larger angles can be used, however.

The pitch angle or angle of attack of the veneer-cutting tool, i.e. the position of the cutting edge of the tool relative to the material being cut, can be varied to produce different cutting effects. With multiple cutting blades the angle of attack as well as the angle of the blades may be different.

Similarly, the geometry of the veneer-cutting tool and/or the cutting edge of the tool may be varied to produce various cutting effects. The thickness of the material being cut can e.g. be controlled by combinations of the rate at which the cutting blade is applied, the depth of the cut, the feed rate of the material being cut, the relative speeds of cutting device and hard-frozen anisotropic foodstuff, and the like.

The invention will now be illustrated by the following Examples, which in no way are to be construed as limiting the scope of the invention.

EXAMPLE I

Raw, butchered cow forequarter meat containing 22 wt. % fat and consisting predominantly of flank from which only the larger part of the *Linea alba* had been trimmed, was frozen into cylindrical logs. The orientation of muscles within the constituent pieces of meat was random.

The logs had a diameter of 15 cm and a length of 50 cm and were formed around a central mandrel of hexagonal shape. The logs were frozen at a temperature of −20° C. and held in cold store at this temperature prior to their use.

The frozen logs were removed from the cold store without tempering and were mounted in the chuck and tail stock of a lathe. The meat was then veneer-peeled at a core temperature of −20° C. by rotating the mandrel at 260 rpm and applying a cutting tool to the end face of the log ("end cutting") at a feed rate of 0.5 mm per revolution. The cutting tool had an operating width of 50 mm, a blade angle of 25° and a thickness of 12.7 mm.

The veneer-peeling produced frozen meat particles in the form of a discontinuous ribbon, having a temperature of −9° C. to −10° C. Individual particles from these ribbons varied in size and size distribution, but were predominantly (and typically) in the order of from 10 mm to 30 mm length and from 20 mm to 35 mm width. The thickness of the particles was consistently within the range of 0.4 mm to 0.8 mm.

A proportion of the veneer-peeled meat was immediately blended with common salt, water, flavouring agents, cereals and onion formed into Beefburgers (90 mm diameter, thickness about 12 mm), using a conventional blending and forming equipment. The moulded products prior to freezing were in the temperature range of from −2° C. to −4° C.

After freezing to about −20° C. and a suitable period of frozen storage (in this case two weeks) the products were conventionally cooked and assessed by a trained taste panel against Beefburgers made with the same batch of meat, the same recipe and by the same processing, except that conventional comminution such as mincing and flake cutting (using Urschel Comitrol (Trade Mark) equipment) was used. For these latter products normal procedures, such as pre-breaking of meat and tempering to a state in which comminution could properly be carried out (i.e. to −4° C.) were employed.

It was found that the products produced using the veneer-peeled meat were superior to those made by conventional comminution, particularly in terms of juiciness and the degree to which gristle or hard particles were perceived during eating.

Figure 1:
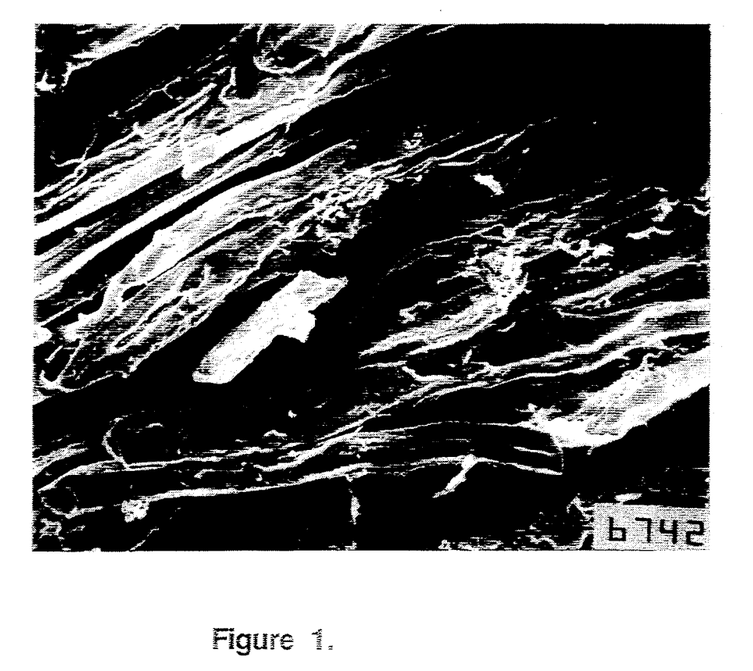
FIG. 1 is a scanning electron micrograph at a magnification of 200 of the product of Example I.
Figure 2:
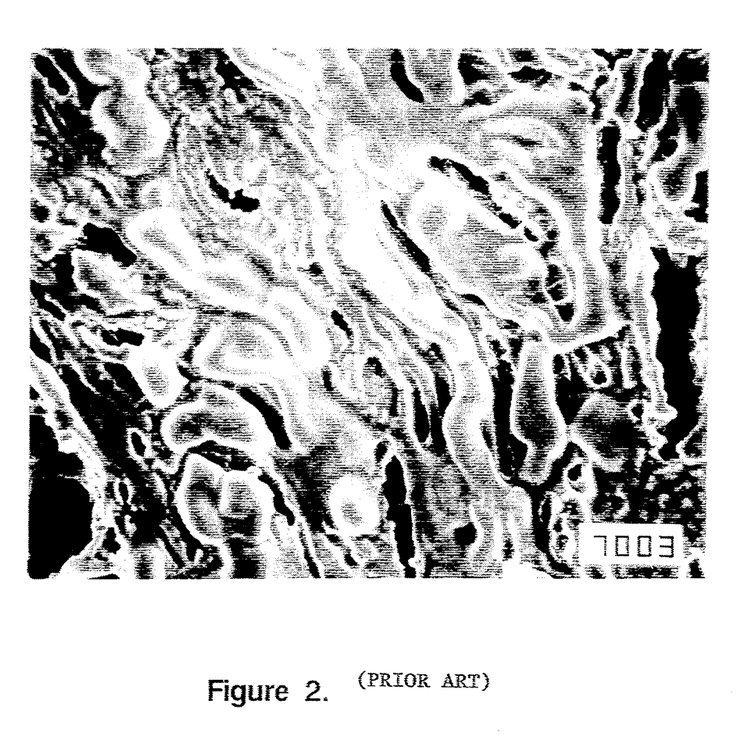
FIG. 2 (PRIOR ART) is a scanning electron micrograph at a magnification of 200 of a comparison minced product.
Figure 3:
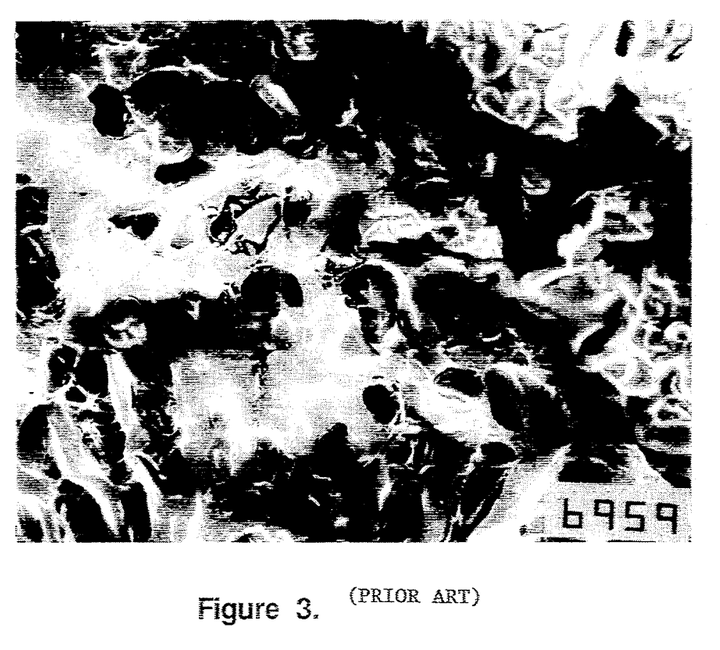
FIG. 3 (PRIOR ART) is a scanning electron micrograph at a magnification of 200 of a comparison minced product.

In order to show the defasciating effect of the method according to the present invention, a scanning electron micrograph was made of the frozen meat particles obtained in Example I. In FIG. 1 the scanning electron micrograph at a magnification factor of 200 of the product of Example I has been shown. It can be seen that the fibres are still intact, whereas there is hardly any connective tissue between the fibres. As a comparison the same meat of Example I was subjected to normal two-stage mincing using firstly a 17 mm kidney plate, followed by a plate with 5 mm holes and also (separately) using a Comitrol (Trade Mark) comminution machine with a 180 cutting head. The resulting products are shown in the scanning electron micrographs depicted in FIG. 2 and 3, respectively, both having a magnification of 200 times. The minced product (FIG. 2) clearly has an entirely damaged structure, showing no fibres at all, whereas the majority of the comminution product (FIG. 3) has an amorphous appearance.

EXAMPLE II

Raw manufacturing grade beef, similar to that described in Example I, was prepared into cylindrical logs in the manner described in Example I.

The frozen logs with a core temperature of −20° C. were veneer-peeled in a manner similar to that described in Example I, except that the speed of log rotation (60 rpm) and the feed rate of the tool (0.5 mm per revolution) varied to produce discrete elongate sections of meat having an average thickness of from 0.5 mm to 1.0 mm, an average width of 35 mm and an average length of 70 mm.

Proportions of the veneer-peeled meat were blended with various proportions of a matrix material, which varied in viscosity according to the constituents, comprising ground beef, common salt, flavouring agents, water and cereal thickener. A typical formulation used (in percentages by weight) was:

|  | wt. % |
| --- | --- |
| Veneer-peeled beef | 74.3 |
| Water | 7.0 |
| Flavouring agent | 1.5 |
| Common salt | 1.0 |
| Finely ground beef | 16.0 |
| Cereal thickener | 0.7 |

The various mixtures of veneer-peeled meat and the matrix material were formed into grill steak type meat products which were subsequently frozen to about −20° C. and stored for a suitable period of time (two weeks).

It was found by an experienced taste panel, upon cooking and consumption of the products prepared, that the products exhibited a range of textures according to the levels of veneer-peeled meat and the volume and the properties of the matrix material. The products containing 60% by weight or more of veneer-peeled meat were perceived as highly fibrous and juicy and their general texture impression was very similar to that of whole meat, although these properties were achieved without the need for extensive trimming of the raw meat, or having to resort to the use of higher grades of meat in terms of lean meat content, anatomical portion or other factors related to intrinsic perceived meat quality.

EXAMPLE III

Raw manufacturing grade beef containing 15 wt. % fat was frozen into cylindrical logs with muscle fibre orientation predominantly parallel to the long axis of the log. The dimensions of the log and the treatment prior to veneer-peeling were as described in Example I, except that meat log was brought to a core temperature of between −10° C. and −15° C. The logs of meat were veneer-peeled by applying a cutting tool to the side of the log ("side cutting") rotating at 111 rpm, i.e. with the cutting edge parallel to the axis of rotation of the log. The cutting tool had an operating width of 70 mm and a blade angle of 25°. The cutting tool was operated at a cutting depth of 0.25 mm per revolution and the resulting cut meat was in the form of a coherent "wadding" of muscle fibres and fat which were conveyed from the cutting tool along a collecting chute. The coherent frozen waddings had dimensions of on average 50 mm in length and 30 mm in width and they consisted of a multiplicity of parallel arrays of muscle fibre bundles together with constituent fat.

The obtained waddings of veneer-peeled meat were compressed and formed around cores of food material, such as cheese, gherkin, asparagus and the like and formed into torpedo-shaped units (about 7 cm long and 3 cm diameter) of combined meat and other foodstuff. After freezing to about −20° C., the oblong food mixtures were coated with various kinds of batter and enrobed with bread crumbs, proprietary cereal particulates, flavoured glaze coating and the like. On cooking and consumption, it was found that these high quality snack products had a fibrous meaty texture with a contrasting texture and flavour/taste of the food material around which the veneer-peeled meat had been formed.

EXAMPLE IV

Raw manufacturing grade hen meat was formed into frozen cylinders in a manner as described in Example I, with the pieces of meat arranged in a random manner. The frozen cylinders were tempered to −10° C. and veneer-peeled by rotating the cylinders at 25 rpm and applying a cutting tool (operating width 70 mm; blade angle 30°) at a feed rate of 0.5 mm per revolution to the end face ("end cutting") of the meat cylinder. The veneer-peeling produced discrete elongate sections of meat with typical dimensions of 100 mm×60 mm at a thickness of from 1.5 mm to 2.0 mm.

These thin discontinuous sections of poultry meat were blended with sodium chloride, water, flavouring agent, sunflower oil and a hydrated protein-based thickener and subsequently formed into nuggets, cutlets and the like forms. A typical formulation was (in percentages by weight):

|  | wt. % |
|---|---|
| Veneer-peeled hen meat | 70.0 |
| Sunflower oil | 3.0 |
| Water | 4.8 |
| Sodium chloride | 0.9 |
| Flavouring agent | 0.3 |
| Hydrated protein-based thickener | 21.0 |

Upon tasting by an experienced taste panel, the products appeared to have an excellent tenderness and fibrous texture. The overall eating properties were judged to be very similar to those of similar types of products based on better quality whole meat.

The veneer-peeled meat product obtained in this example was also formed into a wafer-like arrangement and used to prepare layered product in conjunction with cheese, other meat elements and other food components (e.g. vegetables) to form attractive snack-type products, which had excellent eating qualities.

EXAMPLE V

Raw fresh cod was skinned and filleted and the flesh was formed into cylindrical blocks having a diameter of 15 cm and a length of 50 cm. The orientation of the portions of flesh within the block was random. The fish blocks were blast frozen to a core temperature of −20° C. and stored at this temperature until required. Prior to veneer peeling the fish blocks were tempered in a cold store to a temperature of −5° C. throughout the block. The blocks of fish were veneer peeled at −5° C. by applying a cutting tool to the end face of the blocks ("end-cutting") at a rotational speed of 60 rpm and a cutting tool feed rate of 1.0 mm per revolution. The cutting tool had an operating width of 50 mm, a blade angle of 25° and a thickness of 12.7 mm.

The veneer peeling produced frozen fish particles in the form of discontinuous ribbon-like material having a temperature of −2° C. to −3° C. Within these particles the flake like structure of the fish muscle appeared to be essentially intact. The particles were moulded into shaped fish products without using any salt or other food ingredients, and the shaped products were blast frozen to −20° C. prior to enrobing with batter and breadcrumbs and pre-frying at 195° C. for 80 seconds. The finished products were cooled and then stored at −20° C. for 2-3 weeks prior to evaluation.

It was found that after cooking from frozen by shallow fat frying the products exhibited much of the fibrous characteristics of fish muscle. Thus, this example demonstrates that veneer peeling at frozen temperatures of fragile material such as fish enables shaped products to be produced without the destruction of the fibrous texture of the material—as would be the case with conventional comminution processes such as mincing or Comitrol flaking.

EXAMPLE VI

Deep frozen 25 kg blocks of forequarter beef containing about 20% by weight of fat and consisting largely of flank from which only the largest sections of fascia had been trimmed, were band-sawn into rectangular blocks measuring 10 cm×10 cm×50 cm. After sawing, these blocks were immediately returned to a deep freeze store to maintain a temperature of −20° C. The blocks were removed from cold store without tempering and placed into a housing into which an end plate and ram enabled the block of meat to be driven forwards. The cross-sectional face of the meat block was driven into a cone-shaped cutting device (with the opening towards the meat) consisting of three cutting blades each having a length of 160 mm mounted upon a circular base with a diameter of 350 mm, the cutting blades making an angle of 60° with the base and the top angle of the cutting edge being The cutting device was rotated at a speed of 260 rpm whilst the meat was advanced by the ram at a rate of 1 mm/revolution.

The blades of the cutting device veneer-peeled the meat block initially from the extremities (shoulders) and then from the resulting cone-shaped section of the block.

The resultant meat particles were of variable length and width with a consistent thickness of from 0.5 to 1.0 mm. The obtained meat particles exhibited a very high degree of intact muscle fibre bundles, but with a fractured and weakened collagenous network.

These particles were incorporated into meat products similar to those described in Examples I and II. The products were found to exhibit no detectable particles of gristle and were higher in fibrousness than equivalent products in which similar qualities of meat had been used, which were comminuted by mincing and Comitrol (Trade Mark) cutting.

EXAMPLE VII

Fresh, deboned pork meat was cut into large pieces of lean muscle, semi-lean muscle, fat and rind in a weight proportion of 4:4:1:1 respectively. The mixture of large pieces was formed into composite blocks, measuring 10 cm × 10 cm × 50 cm by filling into suitable containers, whilst compressing lightly to exclude large voids. The filled containers were deep-frozen to a core temperature of −20° C. After demoulding, the blocks were held in a deep freeze store to maintain a core temperature of −20° C.

The blocks were removed from the cold store without tempering and placed into a housing into which an end plate and ram enabled the oblong blocks of meat to be driven forwards.

The cross-sectional face of the composite meat block was driven into a rotating cone-shaped cutting device with its apex facing towards the meat.

The cone-shaped cutting device consisted of a cone of solid one piece construction with a 150 mm base and 120 mm height. The cone contained slots at opposite locations of the cone, on which were mounted cutting blades of 110 mm in length and 16 mm in width. The cone was provided with two cutting blades having a cutting angle of 50° and the cone rotation speed was 60 rpm. The tip or nose of the cone was rounded and provided with its own pilot cutting edge, which assisted in centering of the incoming block of material and which initiated the cutting action. The cone was mounted on a suitable carrier plate, which in turn was connected to a suitable drive shaft. The cone was also designed such that the majority of its section fitted into and rotated within a profiled housing to match the cone geometry. The tolerance between the profiled housing and the rotating cone was in the order of 1.0 mm in order to eliminate or separate any escape of material being driven into the housing and against the cutting sections of the cone. The device was constructed to accomodate square or rectangular shaped blocks and designed such that the diameter of the cone at the point of fitment within the housing was greater than the diagonal of the incoming block of material. The housing was designated to accomodate blocks to nominal dimensions with a degree of irregularity, but to maintain the integrity of blocks during cutting.

The material was veneer-peeled by the cutting blades to form a conical recess in the block which was continually cut as the block advanced. Further blocks were inserted into the housing such that preceding blocks were driven through the device. Cut particles passed from the cutting edge of the blades through slots in the cone and thereby into the hollow section from which they were ejected and collected for use. The particles obtained were in the form of discrete, elongate sections of 0.7 to 1.0 mm thickness and varying length and width, but typically of 50 mm × 12 mm.

The constituent tissues within these particles were loosely intact, and upon microscopic examination exhibited a high degree of intact muscle fibrous tissue, but within all tissues also exhibited a fractured and weakened collagenous network.

A cohesive sausage dough was formed in an orbital mixer from the following ingredients in percentages by weight:

| | |
|---|---|
| Cut particles, as obtained | 62.0% |
| Water | 21.0% |
| Cereal material | 12.0% |
| Salt/Flavours | 5.0% |
| | 100.0% |

The dough obtained was formed into a breakfast sausage with a total meat content of 60% by weight. The sausage obtained was frozen and chill-stored and upon cooking the sausage exhibited a very meaty texture with a degree of fibrousness which would not normally be expected in such products produced by conventional comminution, such as mincing, grinding and chopping.

EXAMPLE VIII

Example VII was repeated, but now using a composite block of lean pork meat, fat, rind material and manufacturing grade beef meat, the relative ratios being selected such that a Frankfurter style sausage recipe was provided.

The blocks were cut as described in Example VII at a core temperature of −20° C. using a cutting depth of 0.3 mm per revolution of cutting blade at a rotation speed of 60 rpm. The resultant particles of 10–14 mm width and variable length, but typically greater than 50–60 mm, were in the form of very thin (typically 0.2 to 0.3 mm in thickness) elongate sections of meat, within which —as seen under a microscope— the connective tissue elements were extensively fractured, whereas the softer tissue had substantially been kept intact. A fine, but somewhat fibrous and cohesive sausage dough was prepared by blending in an orbital mixer the following ingredients (in percentages by weight):

| | |
|---|---|
| Cut particles | 82.0% |
| Salt, flavours and spices | 3.0% |
| Water | 14.0% |
| Starch | 1.0% |
| | 100.0% |

The sausage dough obtained was used in preparing Frankfurter style sausages which were smoked, cooked and cooled as per normal practice for this kind of product. After pasteurisation and storage and upon heating for consumption, the Frankfurter sausages obtained were found to have an excellent resilient nature, a clean "snap" and particularly a more meaty and fibrous texture than Frankfurters prepared from the same raw materials, using conventional chopping and grinding, the further processing methods being the same.

EXAMPLE IX

A green hide from an 18-months steer was trimmed, halved, washed and unhaired as in stage 1 of the procedure described in U.S. Pat. No. 3,634,561. It was then split and the flesh layers, weighing 12 kg at 20% dry collagen solids were cut into about 14 cm squares and steeped at 20° C. for 4 hours in 50 liter of saturated sodium sulphate solution. The solution was then replaced by a similar solution containing additionally sodium hydroxide adjusted to 1-N, which was allowed to act for 22 hours with periodic addition of flake sodium hydroxide to maintain the normality of the solution. After the treatment of the splits, they were washed three times for 10 minutes in water and then soaked for 1½ days in 100 liter of hydrochloric acid solution, (pH=4) containing 2.4 kg of common salt. After that time the splits were neutral at the centre.

The pieces of neutralized split were formed into cylinders in a suitable mould and a mandrel was inserted into the centre of the material. The cylinders had a diameter of 15 cm and a length of 50 cm and were hard-frozen to a core temperature of −20° C. and held in a cold store at this temperature prior to their use.

The deep-frozen cylinders were removed from the cold store without tempering and were mounted by means of the mandrel in the chuck and tail stock of a lathe, whilst simultaneously applying a cutting tool of operating width of 70 mm and a cutting blade angle of 25° to the side of the cylinders, i.e. with the cutting edge parallel to the axis of rotation. The splits were cut at a depth of 0.1 mm per revolution at a speed of 260 rpm. The cut hide split material was in the form of discrete particles, discontinuous ribbons or semi-continuous ribbons of about 70 mm width, depending on the type of hide employed.

The particles obtained were collected in containers and in microscopal examination exhibited pronounced multiple fracturing of the original structure, but considerably retention of very fine fibrous elements.

The particles were converted into collagen dough used in the manufacture of sausages by co-extrusion as described in Example 1 of U.S. Pat. No. 3,622,353, Column 8, lines 65–71. The collagen dough obtained was judged by those experienced and skilled in the art of co-extrusion to be highly satisfactory from a rheological point of view and as to its performance in the co-extrusion process.

It was found that if the hide split material was wound around a hexagonal mandrel and subsequently hard-frozen to a core temperature of −20 C. and similarly processed as described above, equally well results were obtained.

EXAMPLE X

Dehusked and deshelled coconuts were drained and cut into quarters, which were formed into frozen blocks of 10 cm×10 cm×50 cm, together with small pieces of coconut material and an amount of the coconut milk, by freezing them to a core temperature of −20° C.

The obtained blocks were subjected to veneer-peeling, using the apparatus as described in Example VII, using cutting blades with an angle of 20°, a core speed of 60 rpm and a cutting depth varying from 1.0 to 3.0 mm per revolution of blade.

The obtained cut coconut material was in the form of discrete spiral type particles, which were coherent, but internally fractured to yield a very tender, but yet fibrous texture, even when consumed at frozen temperatures. The dimensions of the particles varied according to the applied depth of cut and could also be varied by changing the cutting speed and the configuration and size of the cutting blades.

The coconut particles were maintained in a frozen state until required and were then incorporated into ice cream, chocolate and fruit juice.

On eating these products, the intact, but tender and yet highly fibrous nature of the coconut material was found to be particularly attractive and different from a conventionally finely shredded coconut material, especially with regard to the tenderness of the material.

EXAMPLE XI

Blocks of frozen celeriac, swede and kohlrabi were prepared by freezing the cleaned, peeled material into blocks having core temperatures ranging from −8° C. to −22° C. and the blocks thus obtained were cut, using the apparatus as described in Example VII. The cone rotation speed was 60 rpm and a cutting thickness of from 1.0 mm to 3.0 mm per blade revolution was applied, using cutting blades with an angle of 20°. The obtained vegetable particles varied in size, shape and thickness according to the type of vegetable material, the temperature of operation and the cutting conditions. Some particles were in the form of discrete elongate pieces with a width of 12 to 14 mm and a length of 200 mm or sometimes more.

Upon microscopic examination extensive fracturing of the vegetable tissue within the particles was evident and though substantial weakening had been achieved, the material had not lost all of its structural integrity. When cooked under very mild conditions, the vegetable particles exhibited a tender texture without any stringiness, woodyness or other undesirable features, which usually accompany this type of hard root vegetables. The frozen vegetable particles obtained could be used in a wide variety of food products, especially in high quality meat-based, snack type products.

EXAMPLE XII

Composite blocks consisting of 66% by weight of natural orange juice and 34% by weight of whole sections and segments of peeled oranges were prepared by freezing this mixture in suitable moulds to a core temperature of −20° C.

These blocks at a core temperature of −20° C. were veneer-peeled, using the apparatus as described in Example VII, using a cone rotation speed of 60 rpm and a cutting depth of 4.0 mm per revolution of the cutting blade, using cutting blades with an angle of 20°.

The obtained particles of orange material were of variable size and shape and consisted of ice together with thin fractured sections of fruit. When maintained in a cold state, the particles could be collected and were used in the formulation of ice cream products. The use of this composite block demonstrates the cutting of a composite material, where the hard or brittle part is predominantly ice, but the contrast between the ice and the fruit constituent upon veneer-peeling leads to a material which has a wide range of application possibilities.

EXAMPLE XIII

A series of composite blocks of 10 cm×10 cm×50 cm consisting of ice cream, fruits, chocolate particles and biscuit particles were formed in suitable containers and hard-frozen to core temperatures ranging from −20° C. to −25° C.

For the ice cream component vanilla ice cream and chocolate ice cream were used, and composite blocks were formed with a random or an orderly arrangement of the ice cream component. One composite block was made, in which the central core consisted of whole strawberries, and in a second composite block the central core consisted of whole peeled kiwi fruit, both in an amount of 30% by weight based on the total block.

All the composite blocks were held in a cold store at −20° C. prior to their use. Some composite blocks were subjected to a further crust freezing step to provide a surface temperature of −30° C. and a core temperature of from −20° C. to −25° C.

All these composite blocks were subjected to veneer-peeling, using the apparatus described in Example VII using a core rotation speed of 60 rpm and cutting depths ranging from 1.0 to 3.0 mm per revolution of blade, the cutting blades having an angle of 20°.

The cut material was obtained in the form of discrete, multicomponent particles, which varied from large scroll-like spirals to loosely coherent flake-like structures and from 1 mm thick flake-like particles to 3 mm thick convoluted sections, typically 100 mm in width and of varying length.

The differences in shape and size obtained were dependent on the nature of the constituent materials and the cutting conditions applied.

In the use of these composite blocks of material it was found that the hard or brittle components, such as fruits, certain kinds of chocolate or couverture exhibited fracture and structural weakening. In contrast the components which by their composition, structure and/or ice content were the least hard and brittle were more clearly cut and less damaged and had substantially retained their original structures.

For example the spiral scroll type of particles, obtained from composite blocks consisting of ice cream and hard frozen whole kiwi fruits or strawberries, contained intact areas of ice cream together with thin sections of fractured but loosely intact fruit.

The cut material from the composite blocks was maintained at cold temperatures (e.g. −20° C.) immediately after collection and were later formed into a variety of ice cream, dessert and frozen confectionery products. The cut material could be used directly as surface decoration on ice cream products, or indirectly by recombining it or enrobing or enclosing it in or with ice cream, chocolate, couverture material, fruit sauces, bakery material, and the like.

Particularly the multicomponent cut material particles could be moulded and shaped into a wide range of layered types of structures. Upon eating these products, it was found by an experienced taste-panel in particular that the previously hard or brittle materials had been fractured and weakened to enable them to be very easily consumed, but without losing the very nature and identity of the materials. It was also found that in terms of eating properties the relatively softer, less brittle and/or homogeneous materials were less or not affected by the cutting action.

We claim:

1. A process for cutting a hard-frozen anisotropic foodstuff comprising cutting said foodstuff with a rotating conical cutting device comprising at least one cutting blade adjusted to form an angle with the axis of said foodstuff wherein said cutting blade faces inward to said conical cutting device, such that discontinuous, ribbon-like offcuts of said foodstuff are formed, and strong and brittle parts of said foodstuff are weakened by fracturing without extensive damage to weak and less brittle parts of said foodstuff.

2. A process for cutting hard-frozen anisotropic meat comprising cutting said meat with a rotary conical cutting device comprising at least one cutting blade adjusted to form an angle with the axis of said meat wherein said cutting blade faces inward to said conical cutting device, whereby primary muscle fibre bundles of said meat are defasciated in a controlled manner without plastic deformation or shattering of said primary muscle fibre bundles or muscle fibers; such that discontinuous, ribbon-like offcuts of said meat are formed.

3. The process according to claim 1, further comprising adjusting the core temperature of the hard-frozen anisotropic foodstuff to −25° C. to −5° C. prior to cutting.

4. The process according to claim 1, further comprising adjusting the core temperature of the hard-frozen anisotropic foodstuff to −20° C. to −5° C. prior to cutting.

5. The process according to claim 3, further comprising shaping the anisotropic foodstuff into an elongate form prior to adjusting the core temperature.

6. The process according to claim 5, wherein said elongate form has a cross-sectional form the group consisting of selected from circular, square, rectangular, polygonal, and ellipsoidal.

7. The process according to claim 5, wherein said elongate form is formed by extrusion.

8. The process according to claim 2, wherein said hard-frozen anisotropic meat comprises raw or uncooked meat selected from the group consisting of at least one of mammal meat, fish meat, shellfish meat, and poultry meat.

9. The process according to claim 2, further comprising at least one of a physical and chemical pre-treatment step, prior to said cutting.

10. The process according to claim 1, wherein said hard-frozen anisotropic foodstuff comprises at least one hide material selected from the group consisting of hides, limed hide splits, unlimed hide splits, and enzymatically treated hide material.

11. The process according to claim 1 wherein said hard-frozen anisotropic foodstuff comprises vegetables.

12. The process according to claim 1, wherein said hard-frozen anisotropic foodstuff comprises ice cream.

13. The process according to claim 1, wherein said hard-frozen anisotropic foodstuff comprises coconut.

14. The process according to claim 1, wherein said hard-frozen anisotropic foodstuff comprises a laminate of different foodstuffs.

* * * * *